(12) United States Patent
Darby et al.

(10) Patent No.: US 11,906,331 B2
(45) Date of Patent: Feb. 20, 2024

(54) LINEAR POSITION SENSOR FEEDBACK MECHANISM

(71) Applicant: Goodrich Actuation Systems Limited, Solihull (GB)

(72) Inventors: Jonathan A Darby, Westlands (GB); Daniel Foster, Pelsall (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 578 days.

(21) Appl. No.: 17/167,521

(22) Filed: Feb. 4, 2021

(65) Prior Publication Data
US 2021/0254999 A1 Aug. 19, 2021

(30) Foreign Application Priority Data

Feb. 10, 2020 (EP) ..................... 20275032

(51) Int. Cl.
*G01D 5/00* (2006.01)
(52) U.S. Cl.
CPC ..................... *G01D 5/00* (2013.01)
(58) Field of Classification Search
CPC ........ G01D 5/00; G01D 2205/22; G01D 5/04; B64C 3/56
See application file for complete search history.

(56) References Cited

U.S. PATENT DOCUMENTS

| | | | | |
|---|---|---|---|---|
| 5,381,986 A * | 1/1995 | Smith | ...................... | B64C 3/56 244/49 |
| 7,971,487 B2 * | 7/2011 | Carlen | ................... | G01D 18/00 73/760 |
| 9,296,472 B2 * | 3/2016 | Thoreen | ............. | B64D 45/0005 |
| 10,293,917 B2 * | 5/2019 | Niemiec | ................. | B64C 3/546 |
| 10,315,752 B2 * | 6/2019 | Niemiec | ................... | B64C 3/56 |
| 11,014,645 B2 * | 5/2021 | Niemiec | ................... | B64C 3/56 |
| 11,203,411 B2 * | 12/2021 | Niemiec | ................... | B64C 3/56 |

(Continued)

FOREIGN PATENT DOCUMENTS

| | | |
|---|---|---|
| JP | S61251713 A | 11/1986 |
| JP | H0236310 A1 | 2/1990 |
| TW | 201723423 A | 7/2017 |

OTHER PUBLICATIONS

Extended European Search Report for International Application No. 20275032.9 dated Oct. 26, 2020, 19 pages.

*Primary Examiner* — Yaritza Guadalupe-McCall
(74) *Attorney, Agent, or Firm* — CANTOR COLBURN LLP

(57) ABSTRACT

An apparatus configured to measure the output of a rotary actuator unit includes a rotary actuator unit. The unit includes a stationary portion, a rotating portion, and a main rotational axis (L) that runs in an axial direction from a first end of the rotary actuator unit to a second end of the rotary actuator unit. The first end is opposite the second end. The apparatus also includes a linear position sensor comprising a follower, a sensor, and a sensor arm, wherein the follower is attached to the sensor by sensor arm; and wherein the sensor is attached to the stationary portion. The apparatus also includes a follower track attached or formed in, or on, to the rotating portion. The follower track is aligned in the circumferential direction that is perpendicular to axial direction of the main rotational axis (L). The follower is configured to follow the follower track.

14 Claims, 5 Drawing Sheets

(56) References Cited

U.S. PATENT DOCUMENTS

| | | | |
|---|---|---|---|
| 2018/0002028 A1 | 1/2018 | Polcuch | |
| 2018/0022441 A1 | 1/2018 | Huynh et al. | |
| 2018/0170516 A1* | 6/2018 | Niemiec | B64C 3/546 |
| 2018/0170518 A1* | 6/2018 | Niemiec | B64C 3/56 |
| 2018/0372535 A1 | 12/2018 | Bailly et al. | |
| 2019/0081533 A1 | 3/2019 | Evreinov et al. | |
| 2019/0092455 A1 | 3/2019 | Seminel et al. | |
| 2019/0270509 A1* | 9/2019 | Niemiec | B64C 23/072 |
| 2019/0322352 A1* | 10/2019 | Niemiec | B64C 3/56 |
| 2019/0322355 A1 | 10/2019 | Wilson et al. | |
| 2021/0254999 A1* | 8/2021 | Darby | G01D 5/00 |
| 2023/0249800 A1* | 8/2023 | Bhatia | B64C 3/58 |
| | | | 244/123.7 |

* cited by examiner

LINEAR POSITION SENSOR FEEDBACK MECHANISM

FOREIGN PRIORITY

This application claims priority to European Patent Application No. 20275032.9 filed Feb. 10, 2020, the entire contents of which is incorporated herein by reference.

FIELD

The present invention described herein relates to linear position sensor feedback mechanisms.

BACKGROUND

Some aircraft feature a folding wing configuration wherein the wing tip can be folded to allow the aircraft to occupy less space when on the ground. The folding of the wing tip is controlled by a rotary actuator unit. When the folding wing tip system is in operation, there is a need to measure the output position of the rotary actuator unit in order to calculate the wing tip position and provide feedback control. A problem arising with conventional rotary position sensors is that they are large in volume. It is desirable for the space envelope around the folding wing to be minimised. There is therefore a need for a rotary position sensor that is compact and accurate.

SUMMARY

According to a first aspect there is provided an apparatus to measure the output of a rotary actuator unit. The apparatus comprises a stationary portion, a rotating portion, and a main rotational axis, wherein the main rotational axis runs in an axial direction from a first end of the rotary actuator unit to a second end of the rotary actuator unit, wherein the first end is opposite the second end. The apparatus further comprises a linear position sensor comprising a follower, a sensor, and a sensor arm, wherein the follower is attached to the sensor by sensor arm; and wherein the sensor is attached to the stationary portion. The apparatus further comprises a follower track attached or formed in, or on, to the rotating portion, wherein the follower track is aligned in the circumferential direction that is perpendicular to axial direction of the main rotational axis. The follower is configured to follow the follower track. The follower track and the LPS are configured such that the rotational motion of the rotating portion results in a linear displacement between the follower and the sensor.

Optionally, the follower track may be arranged eccentric to the main rotational axis. Alternatively, the follower track may be helical whereby it is configured to traverse in a circumferential direction around the main rotational axis and also in the axial direction along the main rotational axis.

Optionally, the rotating portion may be coupled to an output lever arm, wherein the output lever arm is configured to rotate from a start position to an end position. The angular distance between the start position and the end position of the output lever arm may be in the range of 80-120°. The maximum displacement between the follower and the sensor may be configured to be 25-50 mm.

Optionally, the apparatus may further comprise a sensor arm guide configured to prevent lateral loading of the sensor arm.

According to a second aspect there is provided a method to track the angular rotation of a rotating portion of a rotary actuator. The method comprises attaching or forming in, or on, a curved follower track to the rotating portion of the rotary actuator, and attaching a LPS sensor to the rotary actuator, wherein the LPS sensor comprises a follower, a sensor, and a sensor arm, wherein the follower is attached to the sensor by the sensor arm, wherein the sensor is attached to a stationary portion of the rotary actuator; and wherein the follower is configured to follow the follower track. The LPS sensor and the follower track are configured such that the rotational motion of the rotating portion results in a linear displacement between the follower and the sensor.

Optionally, the method may further comprise arranging the follower track eccentric to the main rotational axis. Alternatively, the method may further comprise having a helical follower track that is configured to traverse in a circumferential direction around the main rotational axis L and also in the axial direction along the main rotational axis.

Optionally, the method may further comprise an output lever arm that is coupled to the rotating portion, wherein the output lever arm is configured to rotate from a start position to an end position. Optionally, the angular distance between the start position and the end position of the output lever arm may be in the range of 80-120°. Optionally, the maximum displacement between the follower and the sensor may be 25-50 mm.

Optionally, the method may further comprise providing a sensor arm guide configured to prevent lateral loading of the sensor arm.

DETAILED DESCRIPTION

Described herein are linear position sensor feedback mechanisms 20, 30 that comprise a linear position sensor (LPS) 10 configured to sense the output of a rotary actuator unit 15.

Figure 1:
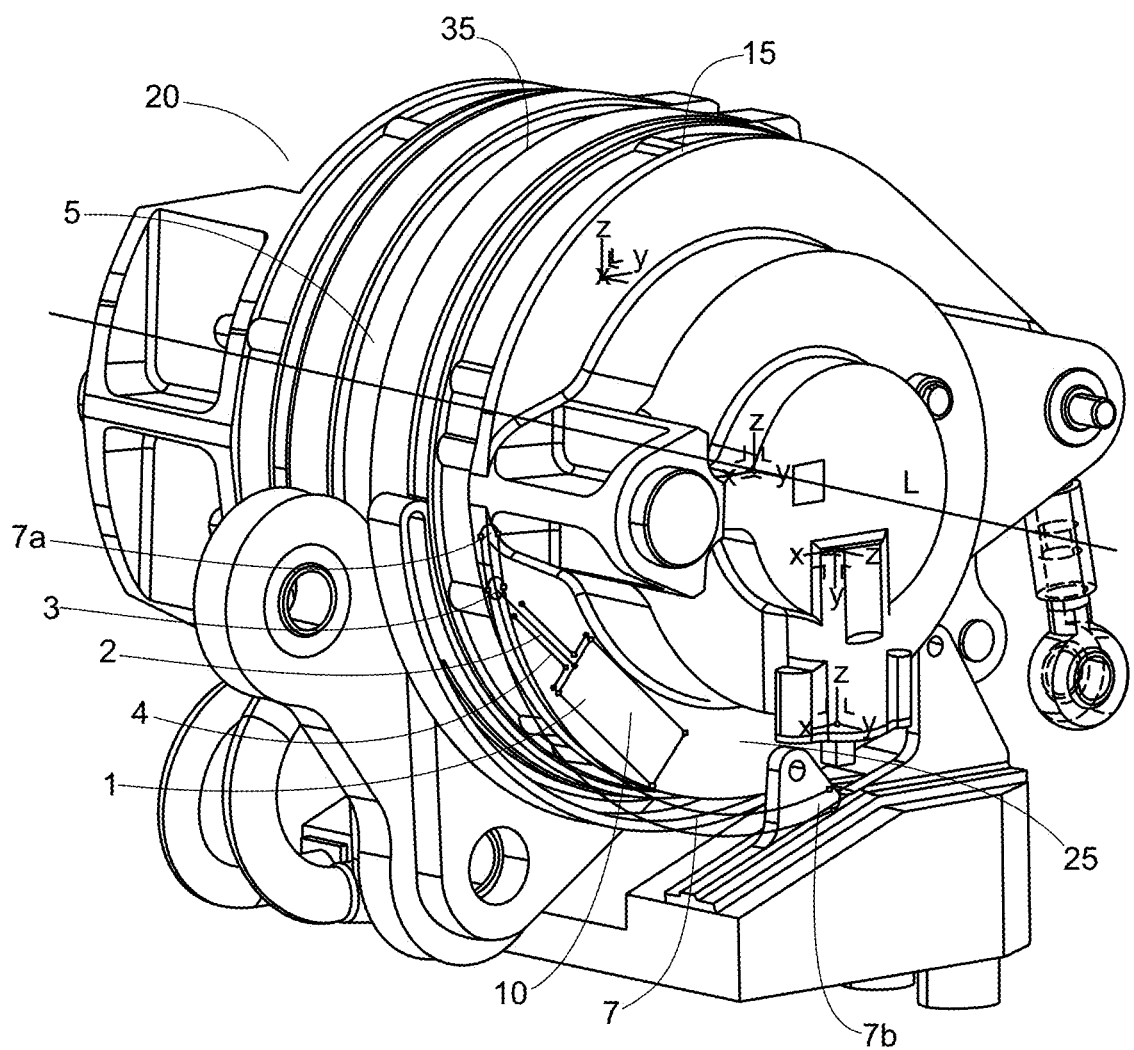
FIG. 1 shows a linear position sensor eccentric feedback mechanism

According to a first aspect of the invention described herein and depicted in FIG. 1 is a linear position sensor (LPS) eccentric feedback mechanism 20. The LPS eccentric feedback mechanism 20 includes an LPS 10 and a rotary actuator unit 15. The LPS 10 includes a sensor 1, a sensor arm 2, and a follower 3, wherein the follower 3 is attached to the sensor 1 by sensor arm 2. The rotary actuator unit 15 includes a stationary portion 25 and a rotating portion 35. The rotating portion is connected to an output lever arm 5. A main rotational axis L runs in an axial direction from a first end of the rotary actuator unit 15 to a second end of the rotary actuator unit 15, wherein the first end is opposite the second end. The rotating portion 35 of the rotary actuator unit 15 is configured to rotate about the main rotational axis L. The output lever arm 5 is configured to rotate about the main rotational axis L between a start position and an end position.

The output lever arm 5 of the rotary actuator unit 15 includes a follower track 7 which is aligned in the circumferential direction that is perpendicular to axial direction of the main rotational axis L. The follower track has a first end 7a and a second end 7b. The follower track is aligned eccentric to the main rotational axis L. Because of the eccentric alignment of the follower track 7, consecutive points along the eccentric follower track 7 from the first end 7a to the second end 7b have a varying radial distance from the main rotational axis L.

The sensor 1 of the LPS 10 is attached to the stationary portion of the rotary actuator unit 15 such that the sensor 1 of the LPS 10 remains fixed during the operation of the rotary actuator unit 15. The follower 3 of the LPS 10 is configured to follow the eccentric follower track 7. The LPS 10 can include a sensor arm guide 4 to prevent lateral loading of the sensor arm 2.

The eccentric follower track 7 and the LPS 10 are configured such that when the output lever arm 5 rotates from the start position to an end position, the follower 3 of the LPS 10 moves along the follower track 7 from a first position to a second position. The eccentric configuration of the follower track 7 allows for a large angular displacement of the output lever arm 5 to produce a small linear displacement between the follower 3 and the sensor 1. The LPS 10 can be connected to a computer (not shown in FIG. 1). The output of the LPS 10 can be interpolated by the computer to determine an accurate rotary position of the output lever arm 5.

Figure 2:
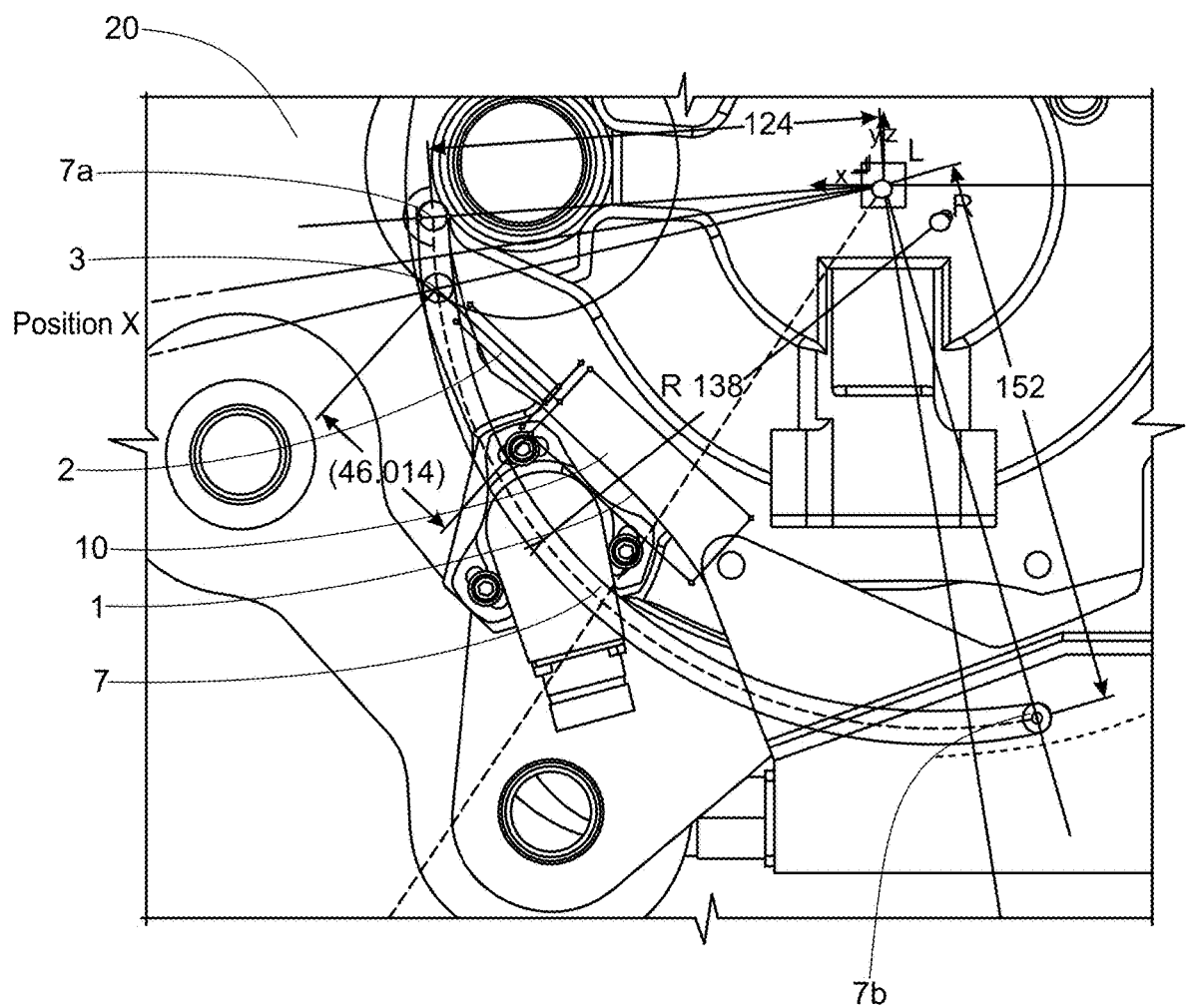
FIG. 2 shows a linear position sensor eccentric feedback mechanism in the start position

FIG. 2 shows an exemplary embodiment of the LPS eccentric feedback mechanism 20. In this example, longitudinal axis R is parallel to the main rotational axis L in an axial direction and is offset from the main rotational axis L by a radial distance. In this example, all points along the eccentric follower track 7 have a radial distance of 138 mm from longitudinal axis R. The distance from the main rotational axis L to a first end 7a of the eccentric follower track 7 is 124 mm, and the distance from the main rotational axis L to a second end 7b of the eccentric follower track 7 is 152 mm.

In FIG. 2, the output lever arm 5 is in the start position and the follower 3 is in position X relative to the follow track 7. In this example, the distance between the follower 3 and the sensor 1 is 46.014 mm.

Figure 3:
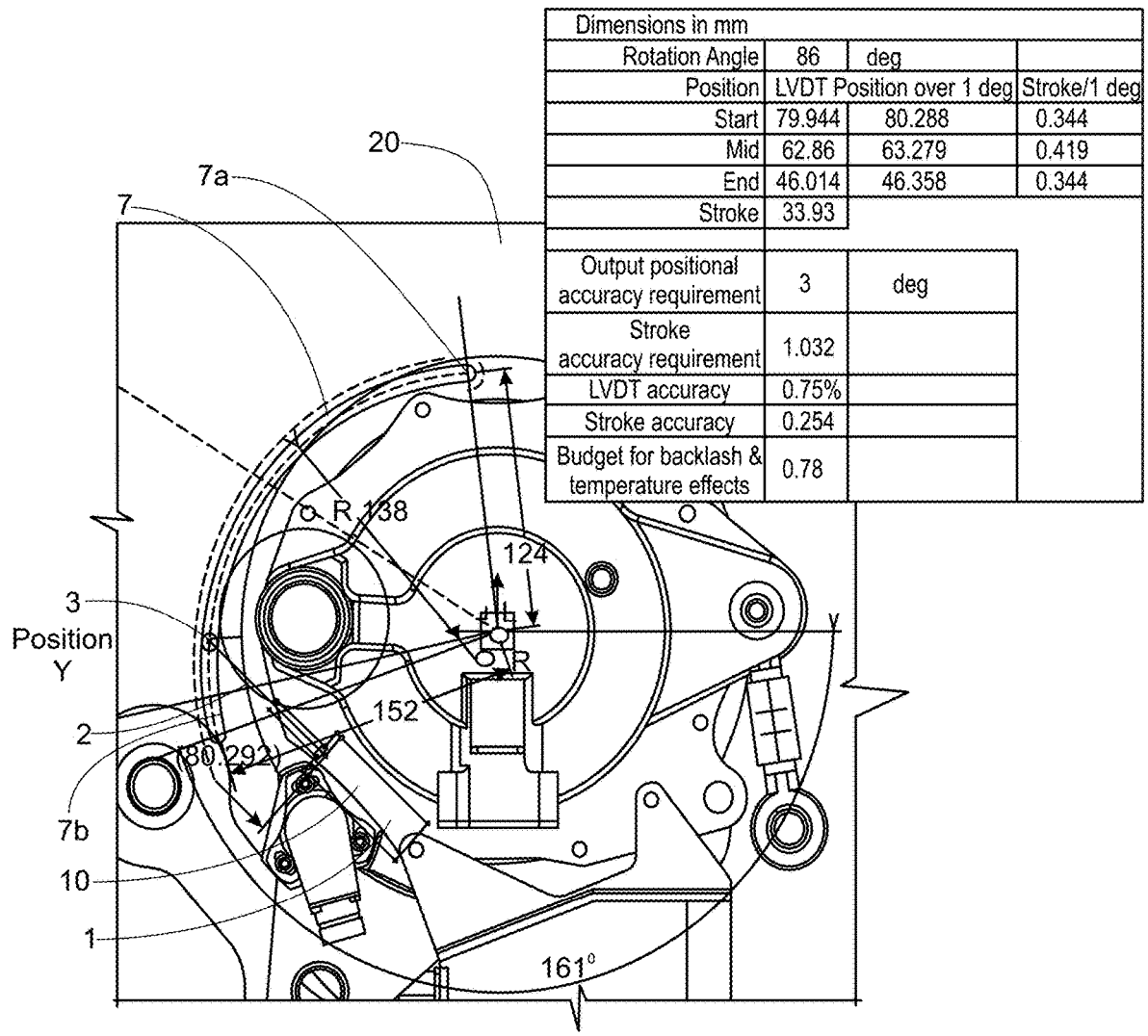
FIG. 3 shows linear position sensor eccentric feedback mechanism in the end position

In FIG. 3, the output lever arm 5 has been rotated by 86° to the end position. The follower 3 is in second position Y relative to the follower track 7 and the distance between the follower 3 and the sensor 1 is 80.292 mm. In this example, a rotation of 86° of the output lever arm 5 is translated to a displacement of 33.93 mm between the follower 3 and the sensor 1 of the LPS 10.

The numerical values disclosed above are by way of example only and other configurations of the eccentric follower track 7 and LPS sensor 10 are also envisaged. These configurations are dependent on the dimensions of the rotary actuator 15, the rotation angle of the output lever arm 5, and the desired sensitivity of the LPS eccentric feedback mechanism 20.

A typical rotary actuator 15 may have a diameter between 250 to 350 mm and a length along the main rotational axis of between 200 to 300 mm. A typical rotational angle of the lever arm 5 between the start position and the end position will be between 80 to 120°. A preferred maximal displacement between the follower 3 and the sensor 1 can be between 25 to 50 mm.

The configuration of the eccentric follower track 7 and the LPS sensor 10 can be adapted in order to produce a desired sensitivity of the LPS eccentric feedback mechanism. By changing the radial distance between the eccentric follower track 7 and the longitudinal axis R, and by changing the distance between the main rotational axis L and the first end 7a of the follower track 7, and the distance between the main rotational axis L and the second end 7b of the follower track 7, the ratio between the linear displacement of the follower 3 and the rotation angle can be adjusted. This ratio determines the sensitivity of the LPS eccentric feedback mechanism.

Figure 4:
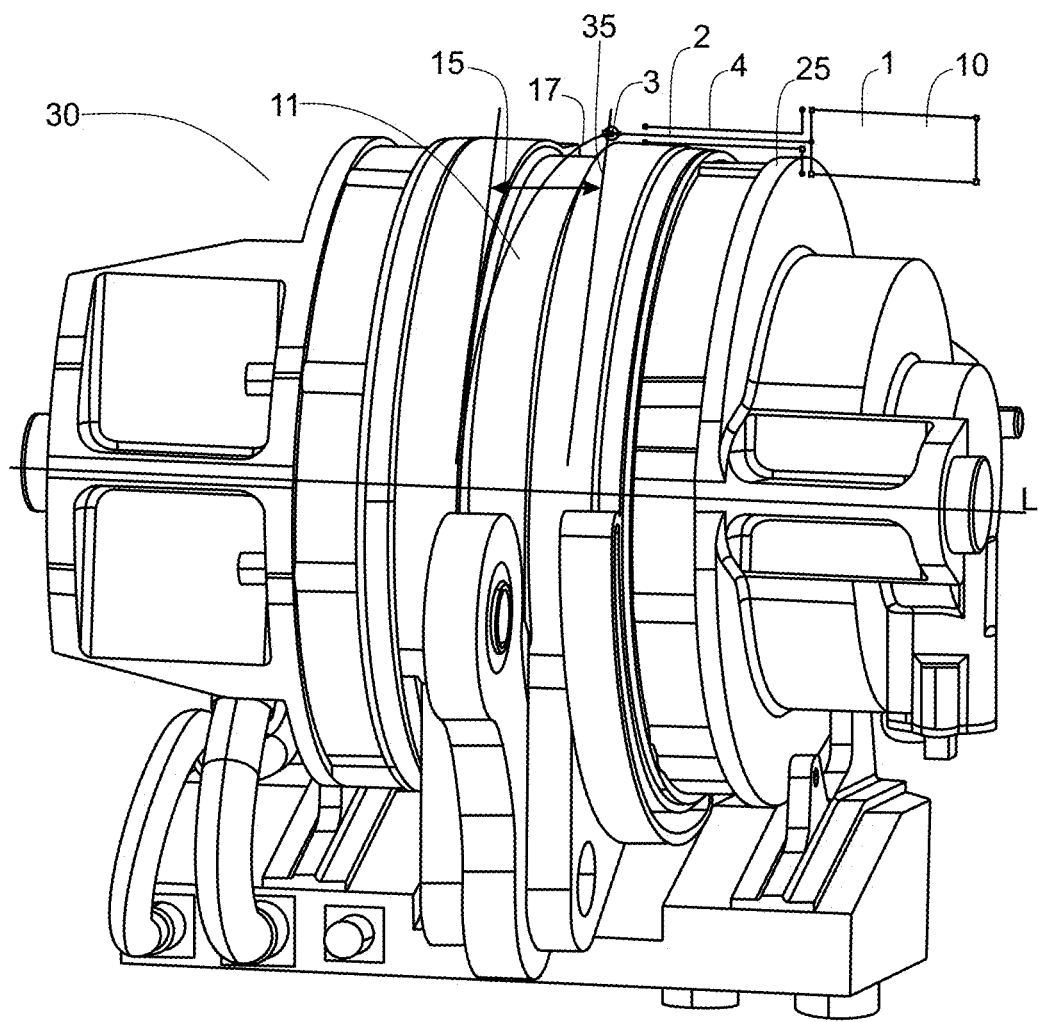
FIG. 4 shows a linear position sensor helical feedback mechanism

According to a second aspect of the invention described herein and depicted in FIG. 4 is a linear position sensor helical feedback mechanism 30. As in the previous embodiment, the LPS 10 includes a sensor 1, a sensor arm 2, and a follower 3; wherein the follower 3 is attached to the sensor 1 by sensor arm 2.

The rotary actuator unit 15 includes a stationary portion 25 and a rotating portion 35. The rotating portion 35 is connected to an output lever arm 5. A main rotational axis L runs from a first end of the rotary actuator unit 15 to a second end of the rotary actuator unit 15, wherein the first end is opposite the second end. The rotating portion 35 of the rotary actuator unit 15 is configured to rotate about the main rotational axis L. The output lever arm 5 is configured to rotate about the main rotational axis L between a start position and an end position.

The rotating portion 35 of the rotary actuator unit 15 has an outer face 11 that is arranged in a circumferentially around the axial direction of the main rotational axis L. A raised helical follower track 17 is attached to the outer face 11 which is configured to spiral about the main rotational axis L. The positions of consecutive points along the helical track 17 are configured so that they traverse in a circumferential direction around the main rotational axis L and also in the direction along the axial direction of the main rotational axis L.

The sensor 1 of the LPS 10 is attached to the stationary portion 25 of the rotary actuator unit 15 such that the sensor 1 remains fixed during the operation of the rotary actuator unit 15. The follower 3 of the LPS 10 is configured to follow the helical follower track 17. The LPS 10 and the helical track 17 are configured such that as the output lever arm 5 rotates, the raised helical track 17 also rotates and the follower 3 of the LPS is displaced in a direction that is parallel to the main rotational axis L. The LPS 10 can be connected to a computer (not shown in FIG. 3). The output of the LPS 10 can be interpolated by the computer to determine an accurate rotary position of the output lever arm 5 and therefore provide feedback. The LPS 10 can include a sensor arm guide 4 to prevent lateral loading of the sensor arm 2.

Figure 5:
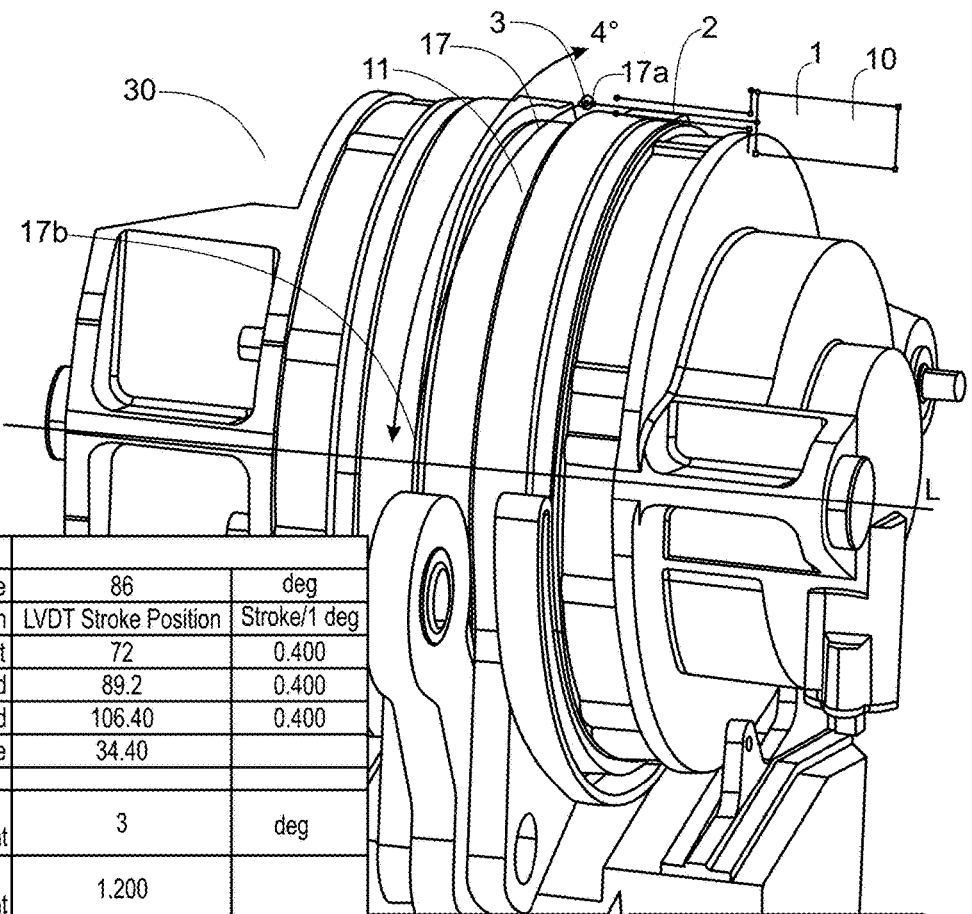
FIG. 5 shows a linear position sensor helical feedback mechanism

FIG. 5 shows an exemplary embodiment of the LPS helical feedback mechanism 30. In this example, the helical follower track 17 has a first end 17a and a second end 17b. When the output lever arm 5 is in the start position, the follower 3 is located at the first end 17a of the follower track 17 and the distance between the follower 3 and the sensor 1 of the LPS 10 is 72. When the output lever arm 5 has been rotated by 86°, the follower 3 is located at the second end 17b of the helical follower track 17 and the distance between the follower 3 and the sensor 1 is 106.4 mm. In this example, a rotation of 86° of the output lever arm 5 is translated to a linear displacement of 34.4 mm between the follower 3 and the sensor 1 of the LPS 10.

The numerical values disclosed above are by way of example only and other configurations of the helical follower track 17 and LPS sensor 10 are also envisaged. These configurations are dependent on the dimensions of the rotary actuator 15, the rotation angle of the output lever arm 5, and the desired sensitivity of the LPS helical feedback mechanism 30.

A typical rotary actuator 15 may have a diameter between 250 to 350 mm and a length along the main rotational axis of between 200 to 300 mm. A typical rotational angle of the lever arm 5 between the start position and the end position will be between 80 to 120°. A preferred maximal displacement between the follower 3 and the sensor 1 can be between 25 to 50 mm.

The configuration of the helical follower track 17 and the LPS sensor 10 can be adapted in order to produce a desired sensitivity of the LPS helical feedback mechanism 30. By changing the distance between the first end 17a and the second end 17b of the helical follower track 17 in the direction that is parallel to the main rotational axis L, the magnitude of the linear displacement of the follower 3 relative to the sensor 1 with respect to the rotation angle of the output lever arm 5 can be adjusted. This ratio determines the sensitivity of the LPS helical feedback mechanism.

Advantages of the above disclosed linear position sensor feedback mechanisms 20, 30 include that position sensing of a rotating output can be achieved in a compact way. Small linear movements detected by the LPS 10 can be used to measure a large rotation angle of the output lever arm 5. The LPS 10 can fit within the constrained space allocation of a thin wing application. A further benefit of the invention is that it is lighter in weight compared to a conventional rotary position sensor and its associated linkage arm mechanism.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. An apparatus configured to measure the output of a rotary actuator unit comprising:
    a rotary actuator unit comprising a stationary portion, a rotating portion, and a main rotational axis (L), wherein the main rotational axis (L) runs in an axial direction from a first end of the rotary actuator unit to a second end of the rotary actuator unit, wherein the first end is opposite the second end;
    a linear position sensor comprising a follower, a sensor, and a sensor arm, wherein the follower is attached to the sensor by sensor arm; and wherein the sensor is attached to the stationary portion; and
    a follower track attached or formed in, or on, to the rotating portion, wherein the follower track is aligned in the circumferential direction that is perpendicular to axial direction of the main rotational axis (L);
    wherein the follower is configured to follow the follower track; and
    wherein the follower track and the LPS are configured such that the rotational motion of the rotating portion results in a linear displacement between the follower and the sensor.

2. The apparatus of claim 1, wherein the follower track is arranged eccentric to the main rotational axis (L).

3. The apparatus of claim 1, wherein the follower track is helical whereby it is configured to traverse in a circumferential direction around the main rotational axis L and also in the axial direction along the main rotational axis (L).

4. The apparatus of claim 1, wherein the rotating portion is coupled to an output lever arm, and wherein the output lever arm is configured to rotate from a start position to an end position.

5. The apparatus of claim 4, wherein the angular distance between the start position and the end position of the output lever arm is in the range of 80-120°.

6. The apparatus of claim 1, wherein the maximum displacement between the follower and the sensor is configured to be 25-50 mm.

7. The apparatus of claim 1, further comprising a sensor arm guide configured to prevent lateral loading of the sensor arm.

8. A method to track the angular rotation of a rotating portion of a rotary actuator, the method comprising:
    attaching or forming in, or on, a curved follower track to the rotating portion of the rotary actuator; and
    attaching a LPS sensor to the rotary actuator, wherein the LPS sensor comprises a follower, a sensor, and a sensor arm, wherein the follower is attached to the sensor by the sensor arm, wherein the sensor is attached to a stationary portion of the rotary actuator; and wherein the follower is configured to follow the follower track;
    wherein the LPS sensor and the follower track are configured such that the rotational motion of the rotating portion results in a linear displacement between the follower and the sensor.

9. The method of claim 8, wherein the follower track is arranged eccentric to the main rotational axis (L).

10. The method of claim 8, wherein the follower track is helical whereby it is configured to traverse in a circumferential direction around the main rotational axis L and also in the axial direction along the main rotational axis (L).

11. The method of claim 8, wherein the rotating portion is coupled to an output lever arm, wherein the output lever arm is configured to rotate from a start position to an end position.

12. The method of claim 11, wherein the angular distance between the start position and the end position of the output lever arm is in the range of 80-120°.

13. The method of claim 8, wherein the maximum displacement between the follower and the sensor is configured to be 25-50 mm.

14. The method of claim 8, wherein the method includes configuring a sensor arm guide to prevent lateral loading of the sensor arm.

* * * * *